G. F. EDGINGTON.
GARBAGE CART.
APPLICATION FILED SEPT. 28, 1910.
1,047,009.
Patented Dec. 10, 1912.
2 SHEETS—SHEET 1.
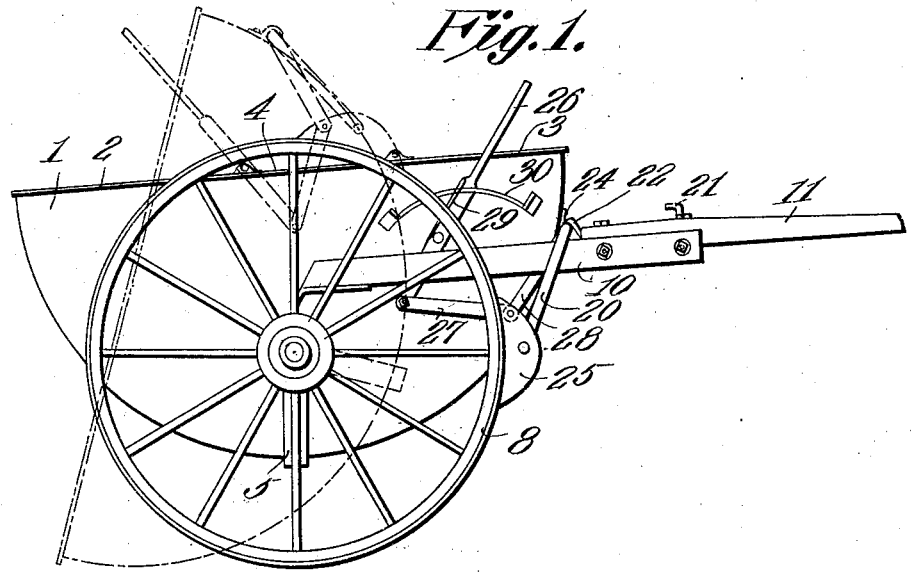
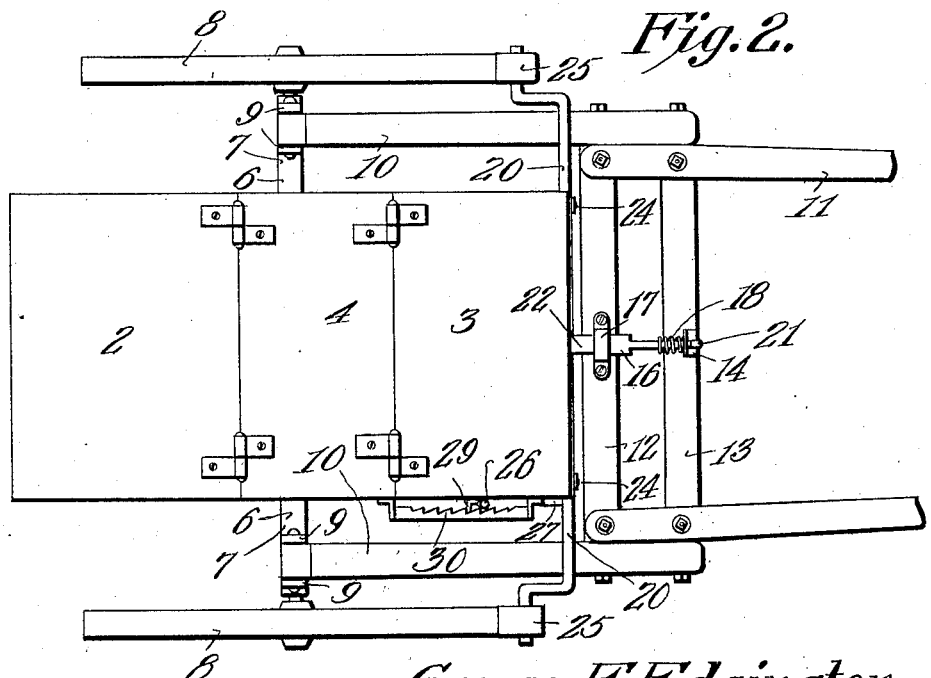
George F. Edgington, Inventor,
Witnesses:
by C. A. Snow & Co.
Attorneys G. F. EDGINGTON.
GARBAGE CART.
APPLICATION FILED SEPT. 28, 1910.
1,047,009.
Patented Dec. 10, 1912.
2 SHEETS—SHEET 2.
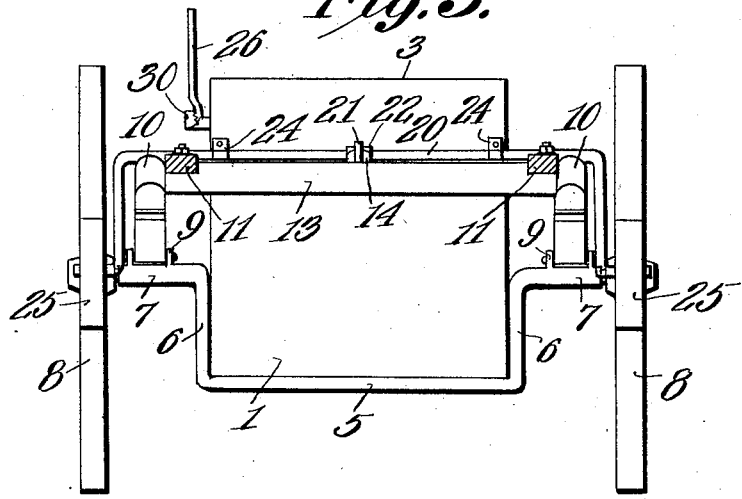
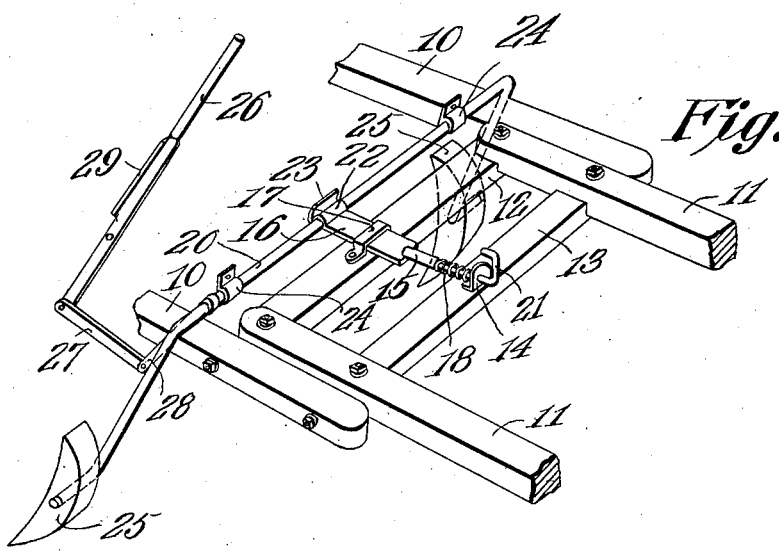
George F. Edgington, Inventor,
Witnesses:
by C. A. Snow & Co., Attorneys.

UNITED STATES PATENT OFFICE.

GEORGE F. EDGINGTON, OF JEFFERSONVILLE, INDIANA.

GARBAGE-CART.

1,047,009.  Specification of Letters Patent.  Patented Dec. 10, 1912.

Application filed September 28, 1910. Serial No. 584,292.

*To all whom it may concern:*

Be it known that I, GEORGE F. EDGINGTON, a citizen of the United States, residing at Jeffersonville, in the county of Clarke and State of Indiana, have invented a new and useful Garbage-Cart, of which the following is a specification.

This invention relates to garbage carts.

The object of the invention is to provide a vehicle of this character having novel means for maintaining the body in load-receiving position and for releasing the body to permit it to drop to dumping position, the latter operation being accomplished by a slight backward movement of the vehicle, the arrangement of the parts being such that all that is required of the operator in order to effect dumping is to lock the body to the wheels by suitable brake mechanism, then release the locking device that normally holds the body in load-receiving position, and then back the cart.

With the above and other objects in view, as will appear as the nature of the invention is better understood, the same consists in the novel construction and combination of parts of a garbage cart, as will hereinafter be fully described and claimed.

In the accompanying drawings forming a part of this specification, and in which like characters of reference indicate corresponding parts: Figure 1 is a view in side elevation of a garbage cart constructed in accordance with the present invention, its load-receiving position being indicated by full lines and its dumping position by dotted lines. Fig. 2 is a top plan view. Fig. 3 is a view in front elevation, partly in section, showing more particularly the construction of the axle. Fig. 4 is a perspective detail view of the brake and body locking mechanism.

Referring to the drawings, 1 designates the body of the cart which is herein shown as semicircular in side elevation, and is provided in its top with two doors 2 and 3 that are hinged to an intermediate fixed cover portion 4. The body may be made of any suitable material, but in order to render the same sanitary it is preferred to construct it wholly of heavy sheet metal. The body is supported upon a drop axle 5, clearly shown in Fig. 3 and bears closely against the two vertical bends 6 thereof, thereby operating to brace the body. The horizontal members 7 of the axle have wheels 8 combined therewith in any preferred manner.

Adjacent to each wheel, the member 7 is provided with two upstanding ears 9, clearly shown in Fig. 3, and between each pair of these ears is pivoted the rear end of one of a pair of hounds 10, arranged at and spaced from the sides of the body, the front ends of which are securely bolted to the thills 11. The rear ends of the thills are connected and braced by a pair of spaced cross bars 12 and 13, upon the latter of which, at its central point, is secured an upstanding ear 14 through which projects the shank 15 of a latch 16, that works in a keeper 17 secured to the cross bar 12. That portion of the shank working within the ear 14, and extending some distance beyond the same is reduced in diameter to receive a coiled spring 18, the function of which is to cause the latch normally to engage with the brake beam 20, as clearly shown in Fig. 4, thus to hold the body in load-receiving position. The outer end of the shank is provided with an upturned finger-hold 21 by which the latch may be retracted against the resistance of the spring. The inner end of the latch is provided with a seat 22 to engage with the brake beam and with a rearwardly extending lip 23 that is provided for the purpose of engaging with the brake beam when the body is brought to load-receiving position, thus to force the latch backward automatically to position again to engage with the brake beam.

The brake beam is journaled in a pair of bearings 24 that are secured to the front of the body, and its ends depend over the hounds and carry brake shoes 25 of the usual or any preferred construction, the beam being seatable on the hounds to support the body in load receiving position.

As a means for throwing the brake shoes into and out of engagement with the wheels, a lever 26 is provided, which is pivotally connected with one side of the body and carries at its lower end a link 27 that is pivotally connected with an arm 28 rigid with the brake beam. The intermediate portion of the lever is provided with a lip 29 that is designed to engage with an arcuate rack plate 30 secured to the side of the body, the teeth of the plate being on its inner side, so that the lever will work between them and the body, and thus be prevented from becoming damaged as by being bent outward, this arrangement of the lever being best adapted to insure proper coöperation between the lip and the rack bar.

To operate the cart to discharge its contents, the operator locks the wheels against rotation, then releases the locking latch 16, and upon the horse being backed the body will drop and dump its contents, the axle being the pivot upon which the body revolves. When the wheels 8 are prevented from traveling rearwardly, as when the wheels enter depressions in the soil or when the wheels are purposely blocked, the body may be tilted in order to dump the contents thereof, by leaving the shoes 25 out of engagement with the wheels, in which event the thills in being forced backward will exert pressure against the ears 9, which will impart a torsional strain to the axle thereby swinging the axle and body out of stable equilibrium and permitting the body to fall backward. It will therefore be seen that the body may be tilted or dropped without the necessity of backing the entire cart, which may be necessary in certain cases. The rearward pressure applied to the ears 9 when the thills are forced backward will be sufficient to swing the body 1 out of stable equilibrium, it being understood that the latch has been disengaged from the beam 20, and as soon as the body is swung out of stable equilibrium, the body will be free to drop rearwardly. After the contents of the body are discharged, the horse will be driven forward, thereby bringing the body back to load-receiving position and again interlocking the latch with the brake beam.

It will be noted that when the latch is disengaged and the body swung rearward to dump the contents thereof, the latch will be pressed inwardly, and upon the body being erected the curved bottom thereof will serve as a cam to force the latch outwardly against the tension of its spring whereby the beam 20 may strike the lip 23 and thereby engage the seat 22 over the said beam to retain the body in load-receiving position.

It will be seen from the foregoing description that although this invention is simple in character, it will be thoroughly effective for the purpose designed, and will result in a material saving in labor to the driver of the vehicle.

While the improvements have been shown as applied to a two-wheeled cart, it is to be understood that they are adaptable for use in connection with one having four wheels, and as this will be readily understood, detailed illustration of so obvious an adaptation of the invention is omitted.

I claim:

1. A dumping cart embodying a dropped axle, wheels on the ends thereof, a body mounted on the axle, the axle having upstanding ears adjacent each wheel, hounds arranged at and spaced from the sides of the body and connected to the said ears, a beam journaled on the front end of the body and having its ends depending over the hounds, the beam being seatable on the hounds to support the body in load receiving position, thills connected to the hounds, cross-bars connected to the ends of the thills, a spring pressed latch carried by the cross bars and adapted to lock the body in load receiving position, shoes carried by the ends of the beam for engaging the wheels, and means carried by one side of the body for swinging the beam.

2. A dumping cart embodying an axle, wheels on the ends thereof, a body mounted on the axle, hounds arranged at and spaced from the sides of the body and connected to the axle adjacent the wheels, a beam journaled on the front end of the body having its ends depending over the hounds, the beam being seatable on the hounds to support the body in load receiving position, thills connected to the hounds, a spring pressed latch carried by the thills and adapted to lock the body in load receiving position, shoes carried by the ends of the beam for engaging the wheels, and means carried by the body for swinging the said beam.

In testimony that I claim the foregoing as my own, I have hereto affixed my signature in the presence of two witnesses.

GEORGE F. EDGINGTON.

Witnesses:
   CHAS. KNIGHT,
   WM. P. SCHOENMETZLER.

---

Copies of this patent may be obtained for five cents each, by addressing the "Commissioner of Patents, Washington, D. C."